United States Patent

Chen et al.

[11] Patent Number: 5,833,909
[45] Date of Patent: Nov. 10, 1998

[54] TRANSFER MOLDING PROCESS USING SELF-STRAIGHTENING ALIGNMENT PINS

[75] Inventors: C. S. Chen; Sherman Cheng, both of Hsien; C. Y. Tseng, Taipei; C. S. Fong, Hsien, all of Taiwan

[73] Assignee: Texas Instruments Incorporated, Dallas, Tex.

[21] Appl. No.: 496,832

[22] Filed: Jun. 29, 1995

[51] Int. Cl.[6] .......................... B29C 33/12; B29C 70/70
[52] U.S. Cl. .................... 264/272.15; 264/272.17; 264/275; 264/277
[58] Field of Search .................... 264/272.11, 272.15, 264/272.17, 275, 277, 278; 425/116, 121, 123

[56] References Cited

U.S. PATENT DOCUMENTS

| | | | |
|---|---|---|---|
| 3,549,477 | 12/1970 | Burgman | 264/275 |
| 4,076,791 | 2/1978 | Barter et al. | 264/275 |
| 5,098,630 | 3/1992 | Ogiu et al. | 264/272.17 |
| 5,108,955 | 4/1992 | Ishida et al. | 264/272.17 |
| 5,447,888 | 9/1995 | Takashima et al. | 264/272.17 |

*Primary Examiner*—Angela Y. Ortiz
*Attorney, Agent, or Firm*—Warren L. Franz; Mark E. Courtney; Richard L. Donaldson

[57] ABSTRACT

A leadframe loading frame with self-straightening alignment pins. A leadframe loading frame is provided with leadframe alignment pins that are made of a shape memory alloy. The pins are also superelastic. The use of the pins results in elimination of the bent alignment pin package defects that occurred when using the leadframe loading frames of the prior art. Other devices, systems and methods are also described.

7 Claims, 2 Drawing Sheets

TRANSFER MOLDING PROCESS USING SELF-STRAIGHTENING ALIGNMENT PINS

FIELD OF THE INVENTION

This invention relates generally to the production and packaging assembly procedures for producing plastic packaged integrated circuits using molding machinery, and specifically to the leadframe loading frame used to transfer leadframe arrays into and out of the transfer molding presses used in forming the plastic packages.

BACKGROUND OF THE INVENTION

In producing integrated circuits in plastic packages using a transfer molding process, such as the conventional dual-in-line package (DIP) or the small outline integrated circuit (SOIC) package, a leadframe loading frame is typically used. Flat ladder shaped arrays of leadframes, each having die pads in the center with metallic leads formed around the die pad, are stamped or etched from metal or alloys. To produce an integrated circuit, a silicon die is attached to each of the die pads of these leadframes using a die attach machine or an equivalent step. The leadframes and the dies are then moved into a wire bonder or manual bonding station, where small diameter wire is used to couple the individual leads of the leadframes to bond pads on the die, thus electrically connecting the signal traces on the integrated circuit dies to the leads of the leadframes.

The ladder shaped leadframe arrays with the wire bonded dies attached are now transported to a leadframe loading station. At the leadframe loading station, several of the leadframe arrays are loaded into a leadframe loading frame. A conventional leadframe loading frame is then placed into the loading station. FIG. 1 depicts a top view of a conventional leadframe loading frame 11. Each finger 13 supports one end of a leadframe ladder array. The leadframe loader positions the leadframe arrays on the leadframe loading frame 11 by positioning alignment holes in the leadframe arrays, which are placed to correspond to the leadframe loading frame positioning pins 15. As the leadframe loading frame is filled with leadframe arrays, the alignment pins 15 enter the positioning holes on the leadframe arrays and the leadframes are aligned in two directions, X and Y, in the horizontal plane.

FIG. 2 depicts one of the fingers 13 of FIG. 1 in a top view. In FIG. 2, finger 13 is shown as a long flat piece of metal. In use, the finger supports the leadframe array which is placed on it. At one end of the finger is pin 15. This pin rises vertically from the plane of the finger 13. Pin 15 is carefully positioned and the leadframe array has position alignment holes that correspond to each of these pins 15, so that as the leadframe array is loaded onto the loading frame, the leadframe array is aligned to the leadframe loading frame in the X and Y directions.

FIG. 3 depicts a cross-sectional view of finger 13. In FIG. 3 the alignment pin 15 is clearly seen protruding from the end of the finger 13 and perpendicularly from the plane of the finger 13. In the prior art, the alignment pins 15 are typically fabricated from a hardened steel material such as carbon steel alloy.

The leadframe loading frame is then used to transport the leadframe arrays into a transfer molding press. In a typical molding operation, thermoplastic or resin mold compound is used with a pressure plunger to force the plastic molding compound into die cavities in the mold which surround the leadframe strips in places where semiconductor device dies are attached to the leadframes. The alignment of the leadframe arrays is determined by the placement of the leadframe loading frame and the leadframes into the bottom half of the mold press. The bottom mold chase which defines the bottom half of each of the package cavities typically has additional alignment pins sticking up vertically. As the leadframe loading frame of FIG. 1 is placed over the bottom mold chase, these alignment pins on the bottom mold chase enter alignment holes in the leadframe arrays and thereby complete the alignment of the leadframes in the mold chase. The accuracy of this alignment is critical to the proper formation of the packages.

In order to make the mold compound flow into the cavities during the molding process, the mold is heated to a temperature at which the molding compound enters a low viscosity phase for a short time period, during which time the mold compound is transferred into the die cavities by pressure. For typical compounds, this temperature is about 185 degrees Celsius, although higher and lower temperatures are used.

The individual leadframes will be properly aligned with the mold chase die cavities if the alignment holes in the leadframe arrays and mold chase alignment pins are properly mated. If the leadframes are improperly aligned, package defects will occur during molding. The alignment can be incorrect in the X direction, the Y direction, or in both directions. Any significant error in alignment can result in defects in molding. Alternatively, the operator may cause a "wire depress" defect in one of the units by manually correcting the loading of the bottom mold chase with the leadframes. Wire depress defects occur when the mold operator attempts to realign the leadframes by touching a bond wire and pushing on it, to cause the leadframe array holes to move into correct positions on the alignment pins of the bottom mold chase. When this is done, the wire touched by the operator either with a tool or manually will often fail. Typically, operators will mark the particular unit which is handled as bad because of the wire depress. This corrective step saves some of the units, but necessarily damages the units actually handled.

Defects that result from misalignment in the leadframe loading steps include incomplete molding of packages and package cracking at later processing steps, or in the field. Package cracking is a costly defect since the unit is bad and cannot be reworked or repaired, even though an expensive integrated circuit die may be inside the defective package. Alignment errors resulting in package cracking are therefore undesirable and must be eliminated. Scrap and process error analysis of these errors indicates that they often are caused by bent leadframe loading frames, and particularly by the bending of the alignment pins 15 on the leadframe loading frames. These bent pins apparently occur because of the pressure of the mold press and the stress related to the pressure. If the loading frame is improperly placed in the bottom mold chase once, the loading frame alignment pins will probably be bent. Only a slight bend in any one of the several alignment pins 15 can cause misalignment of the leadframe arrays loaded in subsequent runs using the leadframe loader. The bent alignment pin leads to scrapped units and additional per unit costs. Eventually the problem is identified and the leadframe loading frame is replaced with a good one. The damaged loading frames must then be reworked and the pins 15 replaced and realigned before they are returned to use.

Accordingly, a need thus exists for an improved leadframe load frame which provides constant correct alignment during the leadframe loading process for molding, and which reduces or eliminates the package cracking defects and the wire depress defects associated with the bent alignment pins which occur on prior art leadframe ladder frames. The improved loading frame should be able to be used for many thousands of runs without the need for repair or rework due to bent pins.

SUMMARY OF THE INVENTION

Generally, and in one form of the invention, a leadframe loading frame is provided which has leadframe alignment pins formed of a shape memory alloy material. Once an object of this material is fabricated, it will return to its original shape after being stressed under certain conditions. For some shape memory alloys, a cycling of temperature can cause the material to return to its original shape.

The leadframe loading frame of the invention takes advantage of the heating and cooling that the loading frame undergoes during the transfer molding operation to provide self-aligning pins of shape memory alloy. Because the transfer mold press is hot, the alignment pin material is heated. When the loading frame is removed from the press after molding, the material is cooled. By using alignment pins that are made of a shape memory alloy material that has critical temperatures that are lower than the operating temperature of the mold, the loading frame alignment pins can be made to recover from a bent condition.

Further, the material used to form the leadframe loading frame alignment pins of the invention is a super-elastic material. The super-elastic property of the material makes deformation of the pins from their original shape extremely difficult, because the material has a very strong tendency to return to its original orientation. This property, in combination with the shape memory property, eliminates the bent alignment pin problems and the scrapped devices of the prior art when the invention is used.

BRIEF DESCRIPTION OF THE DRAWINGS

In the drawings.

Corresponding numerals and symbols in the different figures refer to corresponding parts unless otherwise indicated.

DETAILED DESCRIPTION OF PREFERRED EMBODIMENTS

Figure 1:
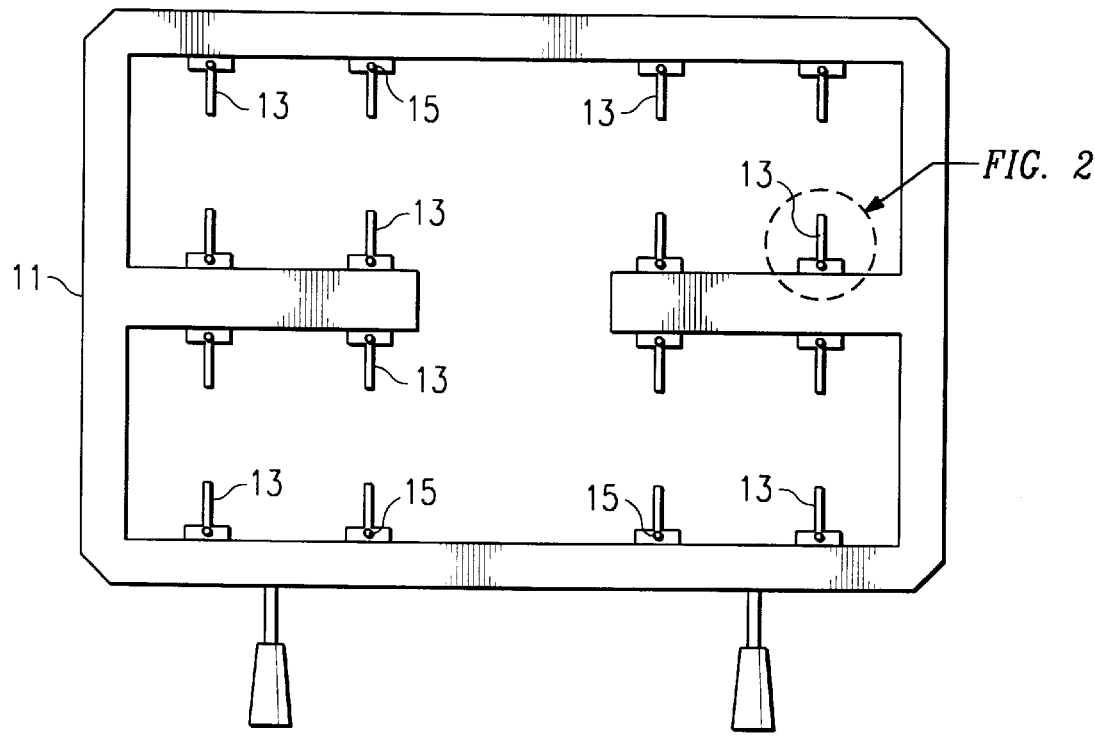
FIG. 1 (prior art) depicts a leadframe loading frame in a top view.
Figure 2:
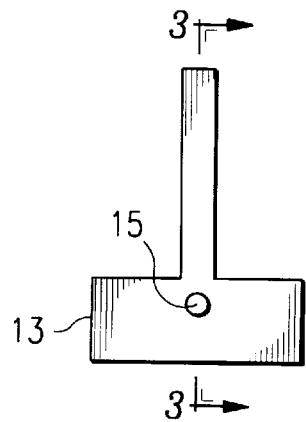
FIG. 2 (prior art) depicts a top view of a single loading frame finger of the leadframe loading frame of FIG. 1.
Figure 3:
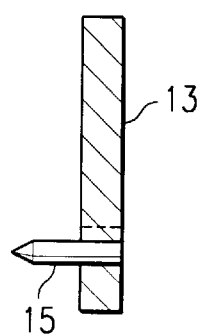
FIG. 3 (prior art) depicts the single loading frame finger of FIG. 2 in a cross-sectional view.
Figure 4:
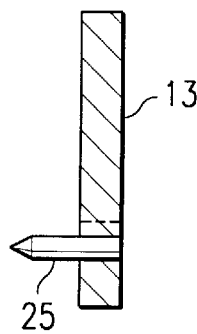
FIG. 4 depicts a cross sectional view of a single loading frame finger using the alignment pin of the invention.

FIG. 4 depicts a side view of a leadframe loading frame finger incorporating the self-straightening pin of the invention. In FIG. 4, finger 23 is comprised of a metal such as the metal of the prior art leadframe loading frame finger. Other materials for the loading frame finger may be used so long as the material chosen is capable of withstanding the heat and pressure of the transfer mold without deformation or damage.

Pin 25 is now comprised of a shape memory alloy material. Shape memory alloy materials are materials that have a hysteresis property with respect to their shape. Under certain conditions, these materials will return to their original shape after a stress which initially bends or deforms the material. The self-straightening pin of the invention takes advantage of the shape memory property of these alloys to provide a self-straightening leadframe loading frame.

In the transfer molding process used to package semiconductor dies in plastic packages, the leadframe loading frame is cycled in temperature. When the loading frame is resting in the loading station where it will be filled with leadframe arrays, it will cool towards room temperature. When it is loaded into the transfer mold, the loading frame will be heated towards the molding temperature. Typically this is a temperature of about 185 degrees Celsius, but may be slightly less or higher, depending on the low viscosity properties of the particular molding compound used in a particular application. By choosing a shape memory material which has a critical temperature less than the mold press temperature, it is possible to cycle the shape memory alignment pin material above the critical hysteresis temperature and let it cool naturally so that the material will return to its original shape as it is normally used in the molding process. No additional steps are required to cycle the shape memory material so that it will return to a correct alignment, the mold press operation automatically heats and temperature cycles the pin material.

The new self-straightening loading frame alignment pin described herein matches the temperatures of the transfer molding process to the shape memory alloy used in the loading frame, such that a bent pin will be cycled above the critical shape memory temperature while in the transfer mold, and then will cool below the critical temperature, and will therefore return to its original, straight, position. Careful choice of the shape memory alloy will ensure that this characteristic occurs each time the pin is bent.

Figure 5:
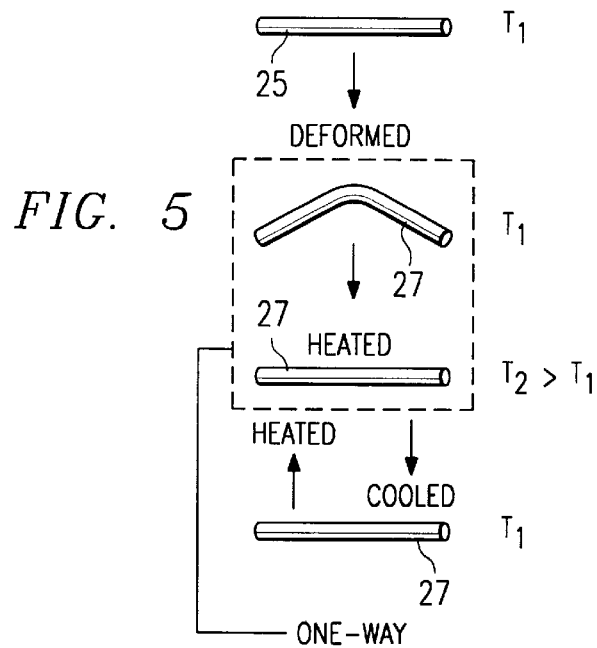
FIG. 5 depicts the shape memory effect on an article formed of shape memory alloy.

FIG. 5 depicts the shape memory effect. In FIG. 5, a shape memory material piece is at a temperature T1, as shown at the top of the diagram. The piece is then deformed to a bent condition. The piece is then heated to T2, which is a temperature greater than the critical temperature for the particular material. The shape memory alloy straightens out back to its original, undeformed shape. The piece is then cooled and remains in its undeformed shape. The figure also illustrates that if the piece is again heated to T2, it remains in its undeformed shape, that is the temperature shape change is a one way transformation.

For a conventional semiconductor package molding operation, several shape memory alloys have been evaluated as potential self-straightening pin materials. The shape memory alloys which could be used are Au-Cd, Ag-Cd, Cu-Zn, Cu-Zn and other materials, such as Si, Sn, Al, Ga, Cu-Al-Ni, Ni-Al, Ti-Ni, Ti-Ni-X, where X is another material such as Cu, Fe, Zr and; Ti-Pd, Fe-Pt, In-Ti, In-Cd, Mn-Cd, and Fe-Pd, among others.

Figure 6:
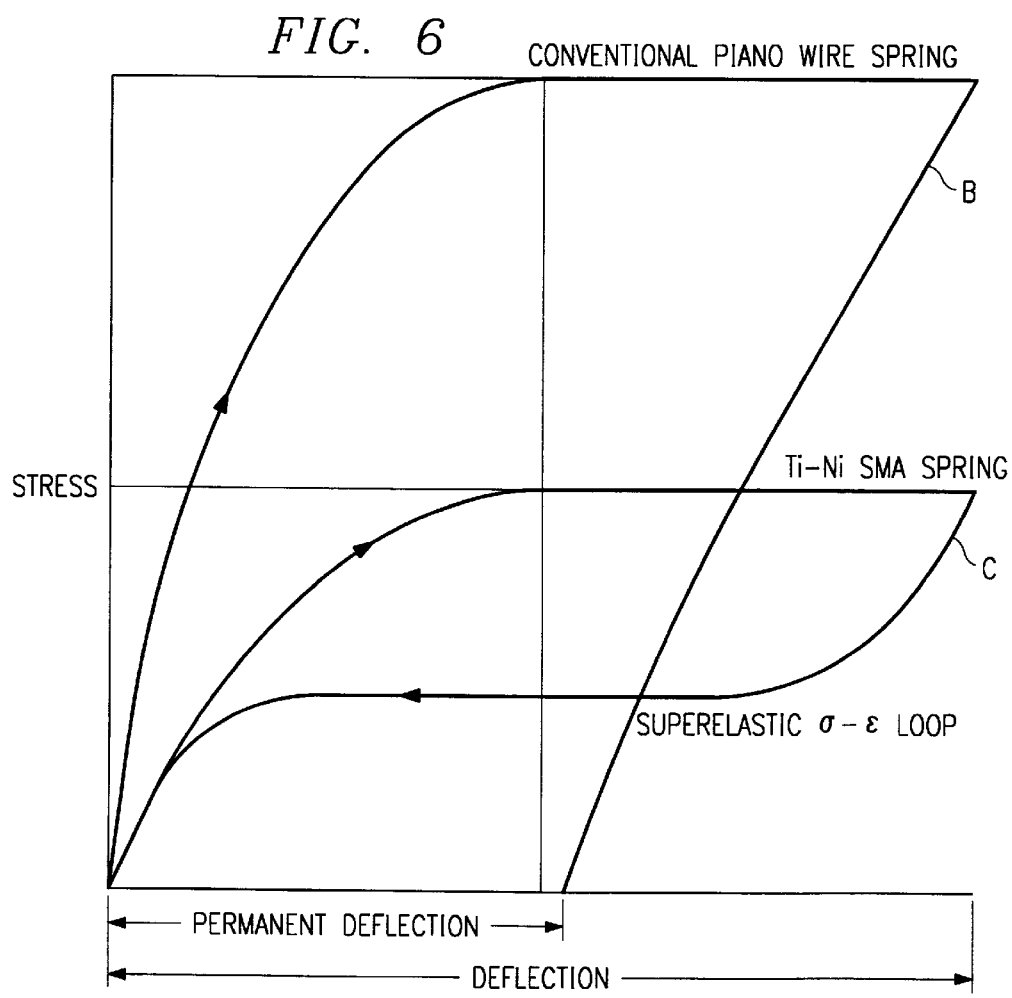
FIG. 6 depicts the application of pressure to a conventional non-superelastic material and compares it to the application of pressure to the shape memory alloy material such as is used in the invention.

In a preferred embodiment, the Ti-Ni alloy was found to be superior to the others for a conventional transfer molding process in terms of cost and performance. An alloy that is primarily nickel, typically at least 80% nickel, and more specifically one that is only 5% Ti, was found to give good results. The transfer mold is about 185 degrees Celsius. If the pin is bent at the leadframe load station or before the loading frame is placed in the transfer mold, the molding temperature is sufficient to cause the shape memory effect to occur and the pin will self-straighten to its original position, eliminating positioning errors in packaged parts, and eliminating the rework required for the prior art carbon steel pins. FIG. 6 depicts the superelastic property of the Ti-Ni alloy of the preferred embodiment. In FIG. 6, two materials are subjected to a deflection pressure stress and then released. The first material is a conventional piano wire, shown in the curve labeled B. As the stress is applied, a maximum deflection is achieved, and then the stress is released. As can be seen from the curve B, the piano wire then relaxes to a permanently deflected state, that is it does not return to its original position, because it has become bent under the stress.

Curve C, in contrast, depicts the response of the Ti-Ni shape memory alloy material. After the stress is maximized and the piece is pushed to a maximum deflection, the material returns to an undeflected condition. In other words, it returns to its original position and is not bent by the stress.

An additional advantage of the Ti-Ni alignment pins is that the pins are cheaper than the carbon steel pins of the prior art loading frames. The preferred embodiment Ti-Ni alloy is primarily a nickel material with about 5% Ti content. Alternatives include raising the Ti content to 15–20%. This material is extremely affordable. In fact, this material is cheaper than the carbon steel alloy alignment pins of the prior art. Retrofitting existing prior art leadframe loading frames is easily accomplished by drilling out the old carbon steel pin, replacing it with one of the new Ti-Ni pins, and soldering or welding the bottom of the pin to the leadframe loading finger 13.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. In a transfer molding process used to package semiconductor dies in plastic packages, wherein alignment pins of a leadframe loading frame are positioned into alignment holes of leadframe arrays, and the loading frame is cycled in temperature between room temperature and an elevated operating temperature at which molding compound enters a low viscosity phase, the improvement wherein the alignment pins are provided as straight pins of a shape memory alloy material having a hysteresis property with respect to their shape and a critical temperature less than the operating temperature, so that pins bent in the loading process will be returned to their original straight shape and unbent pins will retain their original straight shape during normal temperature cycling incident to the molding process.

2. A transfer molding process for packaging a semiconductor die in a plastic package, comprising the steps of:

providing a leadframe loading frame with at least one alignment pin of an original straight shape and being of a shape memory material having a hysteresis property with respect to that shape and a critical temperature;

loading a leadframe with the semiconductor die onto the loading frame and bending the at least one alignment pin;

placing the leadframe with the loading frame into a cavity of the mold; and heating the mold to an operating temperature and flowing molding compound into the mold cavity to mold the plastic package; the operating temperature being greater than the critical temperature, so that the bent at least one pin is returned to its original straight shape as an incident of the hysteresis property of the pin material.

3. The improvement of claim 1, wherein the pins are made of a nickel alloy.

4. The improvement of claim 3, wherein the pins are made of a nickel titanium alloy.

5. The improvement of claim 4, wherein the pins are made of at least 80% nickel.

6. The improvement of claim 5, wherein the pins are made of at least 95% nickel.

7. The improvement of claim 4, wherein the pins are made of a nickel titanium alloy and including a material that is one of the group consisting of copper, iron and zirconium.

* * * * *